United States Patent [19]

Torokvei et al.

[11] Patent Number: 4,609,210
[45] Date of Patent: Sep. 2, 1986

[54] RESTRAINER DEVICE FOR COUPLINGS IN PIPELINES

[75] Inventors: Thomas E. Torokvei, Don Mills; Wayne Lepp, Willowdale, both of Canada

[73] Assignee: Scepter Manufacturing Company Limited, Don Mills, Canada

[21] Appl. No.: 746,880

[22] Filed: Jun. 20, 1985

[51] Int. Cl.4 .............................................. F16L 13/04
[52] U.S. Cl. ..................................... 285/114; 285/373; 285/423
[58] Field of Search .................... 285/373, 114, 423

[56] References Cited

U.S. PATENT DOCUMENTS

| | | | |
|---|---|---|---|
| 2,507,261 | 5/1950 | Mercier | 285/132 |
| 2,738,993 | 3/1956 | Wilson | 285/90 |
| 2,923,561 | 2/1960 | Merrill | 285/413 |
| 3,004,780 | 10/1961 | Main | 285/242 |
| 3,135,537 | 6/1964 | Scott | 285/341 |
| 3,627,357 | 12/1971 | Sanders | 285/174 |
| 4,045,060 | 8/1977 | Daigle | 285/373 X |
| 4,299,413 | 11/1981 | Neher | 285/423 |
| 4,336,959 | 6/1982 | Roche | 285/368 |
| 4,372,587 | 2/1983 | Roche | 285/368 X |
| 4,421,347 | 12/1983 | Kantor | 285/373 X |
| 4,488,738 | 12/1984 | Valdes | 285/423 |

OTHER PUBLICATIONS

"Products for PVC Pipe", Uniflange Corporation, date of publication unknown but prior to Nov. 24, 1982.

Primary Examiner—Dave W. Arola
Attorney, Agent, or Firm—Blake, Cassels & Graydon

[57] ABSTRACT

A thrust restrainer for a joint in a pipeline between a plain end of a synthetic plastic pipe and a fitting comprises a pair of semicylindrical moulded half sleeves bolted together through diametrically extending flange portions, the half sleeves having at one end an internal profile complementary to that of the fitting, and at its other end a semicylindrical internal profile matching the external surface of the pipe, the semicylindrical profile including a plurality of parallel serrations which deform the material of the pipe into engagement with the serrations on bolting together of the half sleeves.

2 Claims, 4 Drawing Figures

RESTRAINER DEVICE FOR COUPLINGS IN PIPELINES

This invention relates to thrust restrainers for couplings in pipelines carrying fluids under pressure, such as water mains.

Such pipelines are commonly formed from lengths of pipe, with or without integral bells and spigots for coupling purposes, and together with fittings such as couplings, tees, elbows, wyes, valves and hydrant runouts. A typical pipeline thus includes a large number of joints between pipe lengths and fittings, and between adjacent pipe lengths where the latter have integral bells. Not only must such joints be fluid tight, but they must also withstand mechanical forces tending to cause joint separation, such as static pressure within the pipeline, surge phenomena within the pipe, thermal expansion and contraction, and mechanical stresses due to various causes. Where plain pipe ends are involved in a joint, it is frequently necessary to provide some means to prevent unwanted withdrawal of the pipe end or movement of it in the joint, which is likely to destroy the fluid tight seal.

For the above reason, various restraining devices have been developed for retaining plain pipe ends within such joints. These fall into two main classes. Where fittings are provided with flanges for bolted connection, a combined jointing and restraining device can be used, comprising an adapter flange to be bolted to the fitting flange such as to compress a sealing element, and auxiliary means to lock the adapter flange to the pipe. An alternative approach has been to apply a separate clamping ring to the pipe end, and to secure this by bolts extending longitudinally of the pipe to a flange either integral with the joint or applied to the joint during installation.

In recent years, the use of pipe moulded from synthetic plastics such as PVC has become widespread in place of iron and steel pipes. The different properties of these materials has rendered necessary modifications of the restraining devices so as to enable sufficient grip to be obtained on the pipe. Typically, the flanges or clamping rings have been split diametrically into two sections, formed with internal serrations which bite into the pipe surface, the sections being bolted together around the pipe. Typical arrangements of this type are described in a booklet "Products for PVC Pipe" (Form No. 124-0481) published by Uni-Flange Corporation of Northboro, Mass., and in U.S. Pat. No. 4,336,959 assigned to the same corporation.

Such devices are essentially adaptations of conventional technology for use with plastic pipe, and whilst effective, they involve a number of manufactured metal parts and a substantial amount of measurement and assembly, and selective tightening of nuts and bolts, which although fairly straightforward, can be awkward and lead to errors under on-site conditions. Where unflanged connections are involved, it is necessary to use special bell rings as a replacement of the flange, as shown on page 7 of the booklet referred to above, and the installation of such rings entails their being installed from the opposite end of a length of pipe.

The present invention seeks to provide a restrainer device for use with plain ended plastic pipe which is effective, cheap to manufacture, and easy to install with little opportunity for error.

According to the invention a thrust restrainer for ensuring the integrity of a joint between a plain ended synthetic plastic pipe and a fitting receiving the end of the pipe in sealing relationship, comprises two half sleeve components moulded from synthetic plastic material, said half sleeves being mateable at mating surfaces to form a full sleeve, said half sleeves each having a first end portion having an internal configuration such as to snugly embrace a bell or flange of the fitting through 180° of its periphery, and a second end portion having semi-cylindrical internal configuration having a plurality of parallel peripheral sawtooth serrations, the minimum radius of the semi-cylindrical configuration at the peaks of the serrations being slightly less than the outside diameter of the pipe to be restrained, the half sleeves having internal longitudinal projecting flanges adjacent their mating surfaces, and bolts for securing said flanges together adjacent both said first and said second end portions.

Preferably the maximum radius of the semi-cylindrical configuration at the serrations is slightly greater than the external diameter of the pipe to be restrained whereby the material of the pipe may be displaced by the peaks of the serrations into the spaces between the serrations to form a rigid connection between the sleeve and the pipe. Preferably also the semi-circular internal configuration includes a semi-cylindrical land axially adjacent the serrations on at least one side and having a radius such as to embrace the pipe tightly, whereby to control the engagement of the serrations with the pipe.

The device of the invention does not require any access from a free end of a pipe or fitting during assembly, is simple to apply, and requires no measurements or adjustments, thus substantially reducing the risk of assembly errors.

Further features of the invention will be apparent from the following description of a preferred embodiment thereof with reference to the accompanying drawings.

Figure 1:
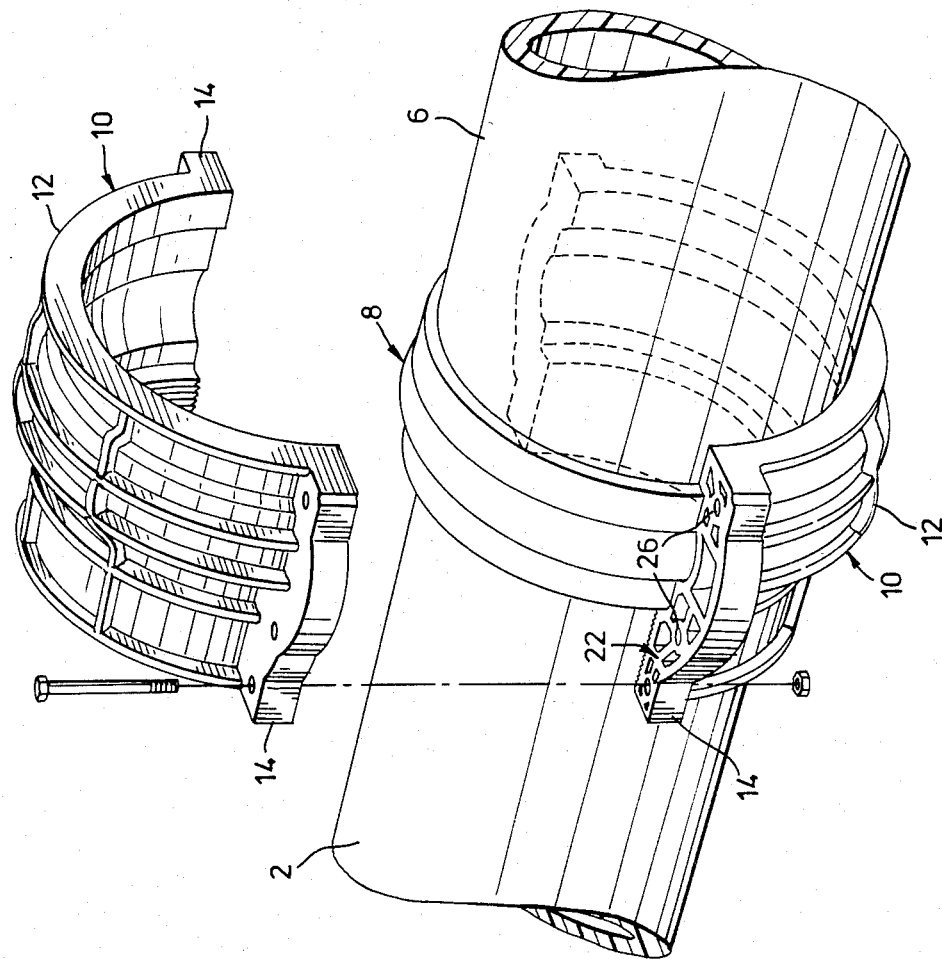
FIG. 1 is a perspective view showing a restrainer in accordance with the invention applied to a coupling between two lengths of plain ended synthetic plastic pipe.

Referring to FIG. 1, two lengths 2 of synthetic plastic pipe, for example, polyvinyl chloride pipe used for water mains, are seen entering a sleeve coupling 6, which may also be moulded from polyvinyl chloride, and has at each each end a bell 8 which receives the end of a pipe to be coupled, the bell also housing a sealing element (not shown), which renders the joint watertight. In order to prevent the pipe from pulling out of the joint or moving excessively relative to the seal, it will be necessary in at least some locations to provide restrainers 10 to lock the pipe into the coupling. Only one restrainer 10 is shown in position in the drawing, in order that one of the bells 8 can be seen. Each restrainer 10 consists of two half sleeves 12, secured together at flanges 14 by bolts 16.

Figure 2:
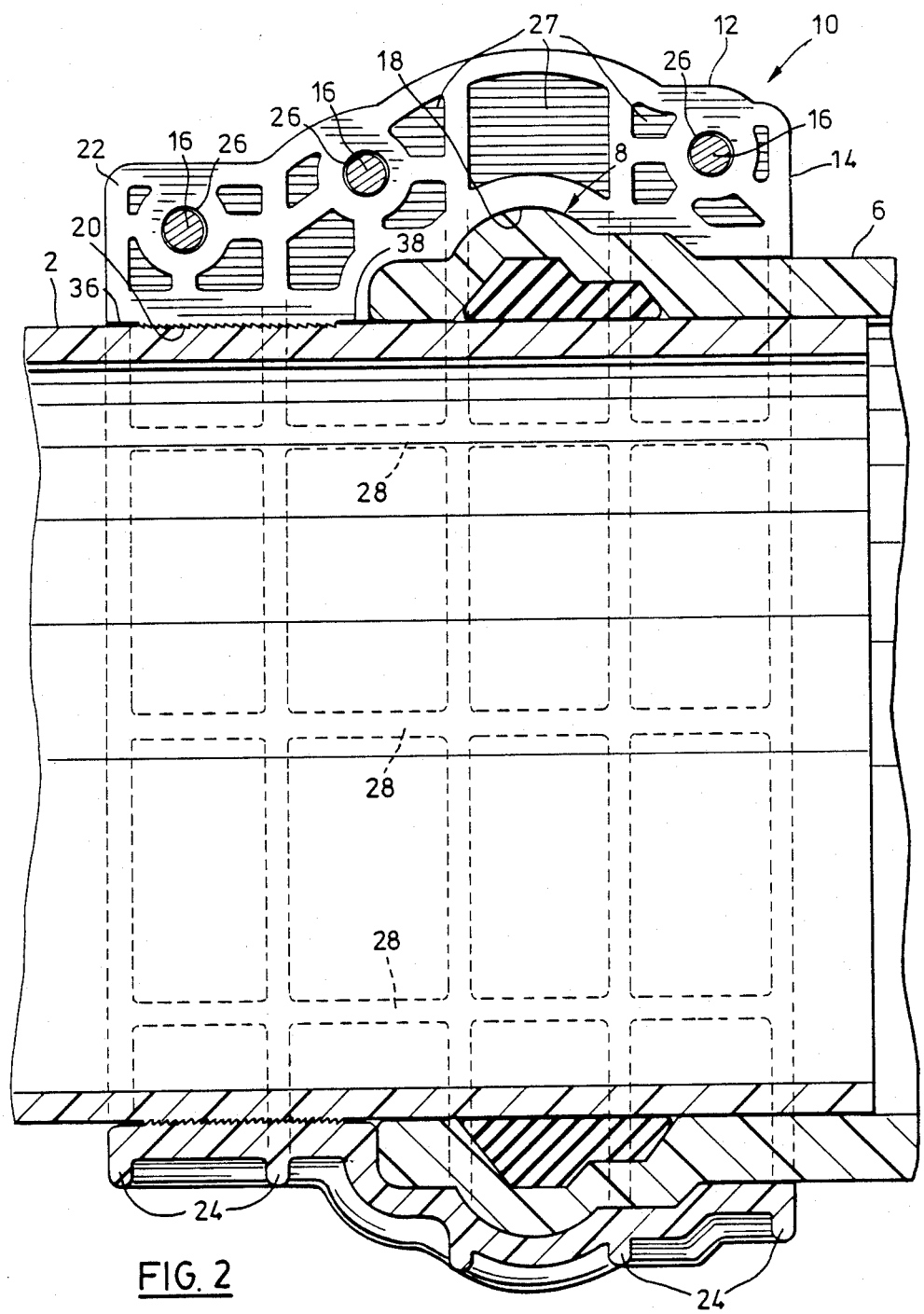
FIG. 2 shows one half sleeve used in the restrainer, the upper half of the figure showing one quadrant of the half sleeve in plan, and the lower half showing the half sleeve in section.
Figure 3:
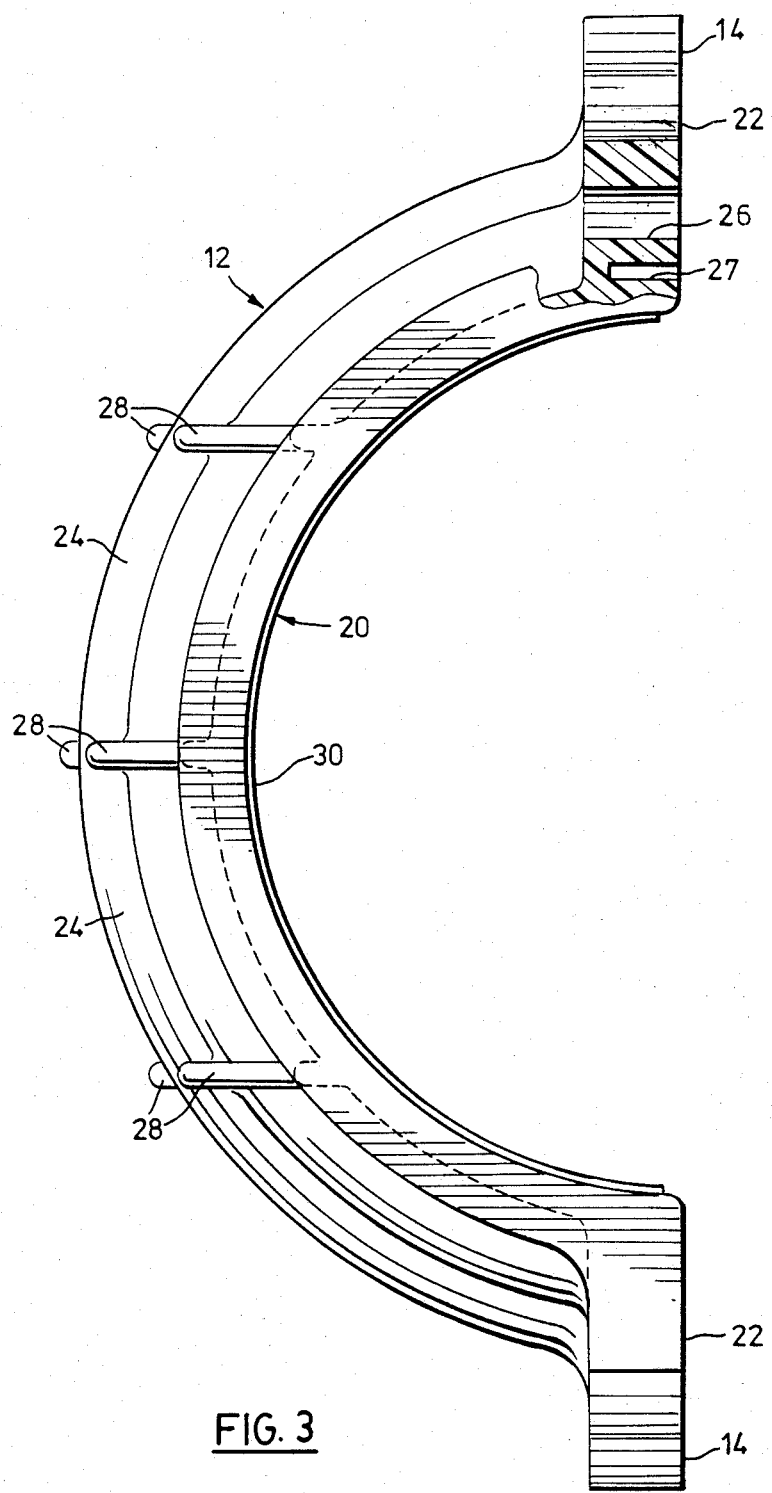
FIG. 3 is an end elevation of the half sleeve.

One half sleeve 12 is shown in more detail in FIGS. 2 and 3. It is moulded in one piece from polyvinyl chloride and one end portion has an internal profile 18 such as snugly to engage the external profile of a bell 10 around 180° of its periphery, whilst the other end has a semi-cylindrical internal profile 20 to engage a pipe 2 or 4. It has mating surfaces 22 designed to mate with corresponding surfaces on a second, usually identical, half sleeve 12, and adjacent outwardly extending flanges 24 having reinforced bolt holes 26 so that the flanges of mating half sleeves may be bolted together by the bolts 16 adjacent both end portions. In order to maintain a reasonably even wall thickness and save material, the surfaces 22 are formed with recesses 26, and the outer surfaces of the half sleeve with ribs 28, which stiffen it and help transfer forces to and from the flanges 24.

Figure 4:
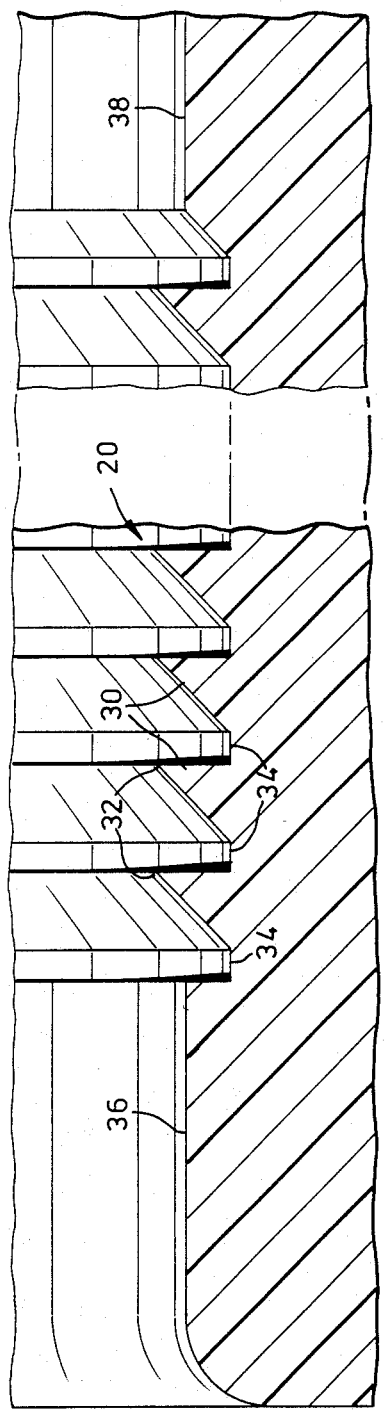
FIG. 4 is a sectional detail of a portion of the sleeve showing the internal serrations on a larger scale.

As best seen in FIG. 4, the internal profile 20 is formed with a plurality of parallel peripheral sawtooth serrations 30. These serrations have peaks 32 at which the internal radius of the profile is slightly less than that of the pipe 2 or 4, separated by valleys 34 of which the internal radius of the profile is slightly greater than that of the pipe 2 or 4. The serrations are axially flanked by lands 36, 38 at which the internal radius is intermediate between that of the peaks and valleys of the serrations and such as tightly to embrace the external diameter of a pipe 2 or 4.

During installation of a pipeline, the pipes 2 and 4 are pushed into the ends of the coupling 6, in which the seals have previously been installed, two half sleeves 12 are assembled around each bell of the coupling and the adjacent portions of pipes 2 and 4, and the bolts 16 are tightened, engagement of the serrations 30 of the half sleeves with the pipe being controlled by engagement of the surfaces 22 with each other and the lands 36, 38 with the pipe. The peaks 32 penetrate the pipe material and displace it into the valleys 34 thus locking the sleeves to the pipes and the pipes to the bells.

It will be understood that, with suitable adjustment of the profiles 18, similar restrainers may be used to hold a plain pipe end within a belled pipe end, or within a flanged joint to a valve or similar device.

It should be noted that the device does not require access to a free end of a pipe or fitting for the installation of any parts, and no adjustments or measurements are required during installation since correct fitting is ensured merely by tightening the bolts 16. The absence of longitudinal strainer bolts eliminates a source of unbalanced forces or excessive stresses due to misadjustment.

The half sleeves 12 may be injection moulded from material which is preferably harder than the polyvinyl choride used for the pipe, in order to promote the penetration of the pipe surface by the serrations 30. A suitable material is a thermoplastic polyethylene terephthalate (PET) moulding compound, such as the glass fibre reinforced compounds sold by Du Pont under the trade mark RYNITE.

We claim:

1. A thrust restrainer for ensuring the integrity of a joint between a plain ended synthetic plastic pipe and a fitting receiving the end of the pipe in sealing relationship, comprising two half sleeve components moulded from synthetic plastic material, said half sleeves being mateable at mating surfaces to form a full sleeve, said half sleeves each having a first end portion having an internal configuration such as to snugly embrace a bell or flange of the fitting through 180° of its periphery, and a second end portion having semi-cylindrical internal configuration having a plurality of parallel peripheral sawtooth serrations, the minimum radius of the semi-cylindrical configuration at the peaks of the serrations being slightly less than the outside diameter of the pipe to be restrained, the half sleeves having internal longitudinal projecting flanges adjacent their mating surfaces, and bolts for securing said flanges together adjacent both said first and said second end portions, wherein the maximum radius of the semi-cylindrical configuration at the serrations is slightly greater than the external diameter of the pipe to be restrained, whereby the half sleeves are moulded from a material harder than that of the pipe to be strained and the material of the pipe displaced by the peaks of the serrations into the spaces between the serrations to form a rigid connection between the sleeve and the pipe, and wherein the semi-circular internal configuration includes semi-cylindrical lands axially adjacent the serrations on each side and each having a radius such as to embrace the pipe tightly, said radius being intermediate the respective radii of the peaks and valleys of the serrations whereby to control the engagement of the serrations with the pipe.

2. A thrust restrainer according to claim 1, wherein the pipe to be restrained is moulded from polyvinyl chloride, and the half sleeves from a polyethylene terephthalate moulding compound.

* * * * *